United States Patent [19]

Bell et al.

[11] 4,300,143
[45] Nov. 10, 1981

[54] THIN PROTECTIVE OVERCOAT LAYER FOR OPTICAL VIDEO DISC

[75] Inventors: Alan E. Bell, East Windsor; Robert A. Bartolini, Trenton; Allen Bloom, East Windsor; William J. Burke, Princeton Junction, all of N.J.

[73] Assignee: RCA Corporation, New York, N.Y.

[21] Appl. No.: 87,453

[22] Filed: Oct. 22, 1979

Related U.S. Application Data

[63] Continuation of Ser. No. 828,816, Aug. 29, 1977, abandoned.

[51] Int. Cl.³ .............................................. G01D 15/34
[52] U.S. Cl. .............................. 346/135.1; 346/76 L; 369/284; 430/945; 430/961
[58] Field of Search .......................... 346/135.1, 76 L; 430/945, 961, 536, 532, 533, 632, 639; 350/3.61; 369/284, 283; 179/100.1 G, 100.1 V

[56] References Cited

U.S. PATENT DOCUMENTS

| | | | |
|---|---|---|---|
| 3,342,754 | 9/1967 | Gorham | 528/396 |
| 3,665,483 | 5/1972 | Becker | 346/135.1 X |
| 3,911,444 | 10/1975 | Lou | 346/135.1X |
| 3,954,469 | 5/1976 | Avanzado | 179/100.3 V X |
| 3,990,084 | 11/1976 | Hamisch | 346/135.1 |
| 4,023,185 | 5/1977 | Bloom | 346/135.1 |
| 4,032,691 | 6/1977 | Kido | 346/76 L X |
| 4,037,251 | 7/1977 | Bricot | 179/100.3 V X |
| 4,038,524 | 7/1977 | Puech | 179/100.3 N X |
| 4,069,487 | 1/1978 | Kasai | 346/135.1 X |
| 4,084,970 | 4/1978 | Bloom | 430/2 |
| 4,097,895 | 6/1978 | Spong | 346/135.1 X |
| 4,101,907 | 7/1978 | Bell | 346/135.1 |
| 4,216,501 | 8/1980 | Bell | 346/135.1 X |

FOREIGN PATENT DOCUMENTS 2522928 5/1975 Fed. Rep. of Germany .
1423912 2/1976 United Kingdom .

OTHER PUBLICATIONS

Congleton et al.; A Comparison of Plastic Versus Metal Coatings for Real Time Laser Recording; JAPE, vol. 3, No. 2, Spring 1977 pp. 97–105.
Chemical Abstract, vol. 63, Jul. 1965, No. 794d.

*Primary Examiner*—Joseph W. Hartary
*Attorney, Agent, or Firm*—H. Christoffersen; Birgit E. Morris; William J. Burke

[57] ABSTRACT

An optical recording medium comprises a light reflecting material which is coated with a light absorbing layer and overcoated with a thin, amorphous, coherent layer of an optically transparent and chemically and thermally stable material such as silicon dioxide. During recording, portions of the light absorbing layer are ablated by a modulated focussed light beam, thereby exposing portions of the reflecting layer while leaving the overcoat layer intact. Information is recorded in the form of a reflective-antireflective pattern. Dust particles and other surface contaminants can be wiped or washed off the recording medium without damage to the light absorbing layer.

8 Claims, 3 Drawing Figures

THIN PROTECTIVE OVERCOAT LAYER FOR OPTICAL VIDEO DISC

The Government has rights in this invention pursuant to Contract No. MDA904-76-C-0429 issued by the Department of the Army.

This is a continuation of application Ser. No. 828,816, filed Aug. 29, 1977 now abandoned.

This invention relates to a novel optical recording medium. More particularly, this invention relates to an optical recording medium comprising a reflective layer coated with a light absorbing layer on a substrate and overcoated with a thin, hard, inert, transparent layer.

BACKGROUND OF THE INVENTION

Spong, in a copending application entitled, "Information Record and Related Recording and Playback Apparatus and Methods", U.S. Pat. No. 4,097,895, issued June 27, 1978 and incorporated herein by reference, describes an ablative recording system whereby a focussed modulated light beam, such as a laser beam, is directed at an ablative recording medium. The recording medium comprises a light reflecting material coated with a light absorbing material on a substrate. The thickness of the light absorbing layer is chosen to reduce the reflectivity to a minimum value so that a maximum of light energy impinging on it is retained therein and is converted to thermal energy. This thermal energy causes the light absorbing material in the area struck by the light to ablate, thereby exposing selected portions of the light reflecting layer. During readout, the contrast between the light reflected from the absorbing layer, which is at the reflection minimum, and the light reflecting layer is detected.

Ongoing work in this area has resulted in the improved performance of the materials employed. Thus, is an illustrative embodiment of this recording medium, a substrate which is a flat, smooth non-conductor of heat is coated with a thin layer of a light reflecting material such as aluminum. The aluminum layer is passivated as described in a copending application entitled, "Ablative Optical Recording Medium" by Bartolini et al, Ser. No. 668,504, filed Mar. 19, 1976. The passivated aluminum layer is in turn coated with a layer of an organic light absorbing material such as 4-phenylazo-1-naphthylamine as described in Bloom et al, "Ablative Optical Recording Medium", U.S. Pat. No. 4,023,185.

Alternatively, the light reflecting layer is coated with a transparent dielectric material such as silicon dioxide. A thin layer of a metal is coated thereon to serve as the light absorbing layer. This configuration is described by Bell in U.S. Pat. No. 4,216,501 issued Aug. 5, 1980 and entitled, "OPTICAL ANTI-REFLECTIVE INFORMATION RECORD". Titanium is the metal most frequently used for this application.

When an organic dye is used as the light absorbing layer, a continuing problem is the mechanical delicacy of the dye layer. A protective coating with good mechanical properties would make it easier to handle the recording medium without damage to the dye layer. In addition, an overcoat layer would protect the dye or metal light absorbing layer from reacting with the atmosphere, thereby extending the lifetime of the recording medium.

Another problem affecting both configurations of the recording medium is the effect of surface dust which precipitates onto the medium from the environment and causes signal defects or dropouts on readout or recording. As each dust particle moves under the focussed spot of the recording laser beam, it effectively shadows that portion of the track on which it lies, thus preventing the formation of information pits for the segment of the picture signal. On playback the section of recorded track which contained the dust particle exhibits a picture defect or dropout caused by the temporary loss of information. An improved recording medium would make it possible to remove dust safely without abrading or otherwise disturbing the light absorbing layer.

SUMMARY OF THE INVENTION

We have discovered an improved optical recording medium which comprises a light reflecting material coated with a light absorbing material and overcoated with a thin layer of a solid, transparent, hard, inert material of a certain thickness. The protective overcoat permits wiping or washing of the recording medium to remove surface dust particles without disturbing the light absorbing layer. Additionally, it protects the light absorbing layer from chemical attack by the atmosphere.

DETAILED DESCRIPTION OF THE INVENTION

Figure 1:
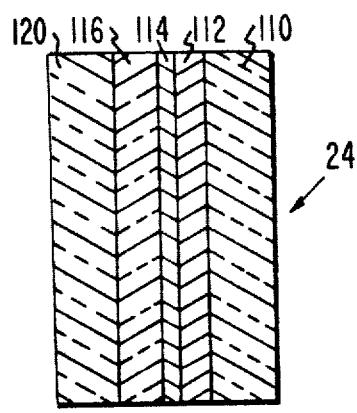
FIG. 1 is a cross-sectional view of a recording medium of the invention prior to recording.

The present invention is directed to a record blank for use with a recording laser beam which provides light of a given frequency. The blank includes a layer of material which reflects light at the laser frequency coated with a layer of material which absorbs light at the laser frequency. Overlying the light absorbing layer is a thin, transparent, inert, protective overcoat layer which can be washed or wiped to remove surface contaminant particles. If desired, the overcoat layer can be applied after recording, provided the light absorbing layer is kept clean.

The light reflecting material can be coated on a substrate with an optically smooth, flat surface to which the subsequently applied light reflective layer is adherent. A glass or plastic plate or disc is suitable. The reflecting layer should reflect light at the wavelength employed for recording. A gold layer about 800 angstroms thick forms a good, non-reactive reflecting layer. An aluminum layer from about 250 to 500 angstroms thick is also sufficient for this purpose. The aluminum layer can be oxidized to a depth of about 30 angstroms in order to passivate the surface.

The light absorbing layer must be absorbing at the wavelength used for recording. In addition it should form an amorphous, coherent film of a thickness that minimizes light reflection. Further, the light absorbing layer should be readily ablatable at low temperatures to form clearly defined, regularly shaped holes. A layer of 4-phenylazo-1-naphthylamine, obtained by evaporating the dyestuff Sudan Black B in a vacuum chamber, forms an excellent coating. Another good light absorbing layer is formed by coating the light reflecting layer with a layer of silicon dioxide which, in turn, is coated with a thin layer of titanium.

Preferably, materials for overcoats according to the invention are hydrophobic and stable with respect to ambient conditions and any solution used to wash the recording medium. In addition, suitable materials usually should be amorphous, optically transparent and non-scattering at the recording and readout wavelength. When the signal is recorded through the overcoat, the overcoat should allow formation of the signal elements beneath it and readout through it without substantially affecting picture quality. Therefore, it is preferable that an overcoat material have a sufficiently high melting point and hardness to resist rupture during recording. Because the organic dyes used for the light absorbing layer are readily soluble in most organic solvents, a desired characteristic of an overcoat material is the capability of forming an amorphous layer by a non-solvent deposition process. Additionally, preferred materials will be able to withstand any mechanical stress introduced by routine handling.

The initial antireflection, light absorbing condition of the light absorbing layer can be preserved if the thickness of the thin protective overcoat layer is carefully controlled. Optimally, the thickness of an optically passive, non-reflecting overcoat layer will be equal to $m\lambda/2n$, where m is an integer, $\lambda$ is the wavelength of the recording or readout light from the laser, and n is the refractive index of the overcoat material at the recording or readout wavelength.

Both organic and inorganic overcoat materials are suitable for use in the present invention. Inorganic dielectric materials have higher melting points and provide harder films than organic materials, thus reducing the likelihood of rupture during recording. In addition, inorganic materials usually are not attacked by any organic solvents which might be used to wash the discs. Therefore, they are somewhat more versatile overcoat materials than the organic materials.

In a preferred embodiment, a silicon dioxide ($SiO_2$) overcoat of an appropriate thickness is applied to a disc previously coated with light reflecting and light absorbing layers. Electron-beam deposition under high vacuum or reactive glow discharge from gaseous monomers such as silane are the preferred methods of forming the $SiO_2$ layer. There is no noticeable difference between $SiO_2$ layers formed using these two methods. Resistance heating yields $SiO_x$, where x is any value between 1 and 2. $SiO_x$ is less durable than $SiO_2$.

Several organic materials also have been identified as suitable for use as thin overcoats in the present invention. Derivatives of sucrose in which the hydroxyl groups on the sucrose are replaced by ester groups, such as acetyloxy or benzoyloxy groups, form good protective overcoats. In an illustrative embodiment a layer of sucrose benzoate, formed from sucrose in which six or more hydroxyl groups have been replaced by benzoyloxy groups, is evaporated onto the light absorbing layer of the recording medium. Sucrose octaacetate also can be applied by evaporation to form a good overcoat layer.

Another class of materials which form suitable overcoat layers for use in the present invention are pentaerythritol derivatives of the rosin acids. These materials are low molecular weight (3,000–7,000) thermoplastics which can be applied by evaporation. Pentaerythritol esters of partially or fully hydrogenated rosin acids, where the principle rosin acid component is abietic acid and the softening point is about 104° C., form good overcoats.

Highly crosslinked films prepared in situ by glow discharge or by polymerization of a reactive monomer deposited on the surface of the light absorbing layer are also good overcoat materials. Suitable films include those prepared by exposing to glow discharge either a mixture of acetylene and nitrogen (1:3 ratio), or perfluoromethylcyclohexane in an argon carrier gas. Using the method described in U.S. Pat. No. 3,342,754, issued to Gorham and entitled, "Para-xylylene Polymers", highly crosslinked polymeric conformal coatings can also be prepared having repeating units of the general formula:

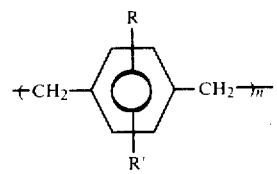

wherein n indicates the number of repeating units in the polymer and R and R' can be H or Cl.

The invention will be further explained by reference to the drawings:

FIG. 1 shows a recording medium 24 of the invention prior to exposure to a recording light beam comprising a substrate 110, a light reflecting layer 112 with a transparent passivating layer 114 thereon, a light absorbing layer 116 and an overcoat layer 120 of silicon dioxide or other suitable inorganic or organic material.

Figure 2:
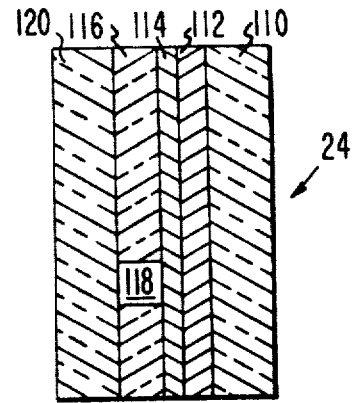
FIG. 2 is a cross-sectional view of a recording medium of the invention after recording.

FIG. 2 shows a recording medium of the invention after exposure to a recording light beam wherein the light absorptive layer 116 has been ablated to leave a pit 118, exposing the passivating layer 114 to light while leaving the overcoat layer 120 intact. It will be understood that the recording medium after recording contains a plurality of pits 118 rather than the single one shown in FIG. 2.

Figure 3:
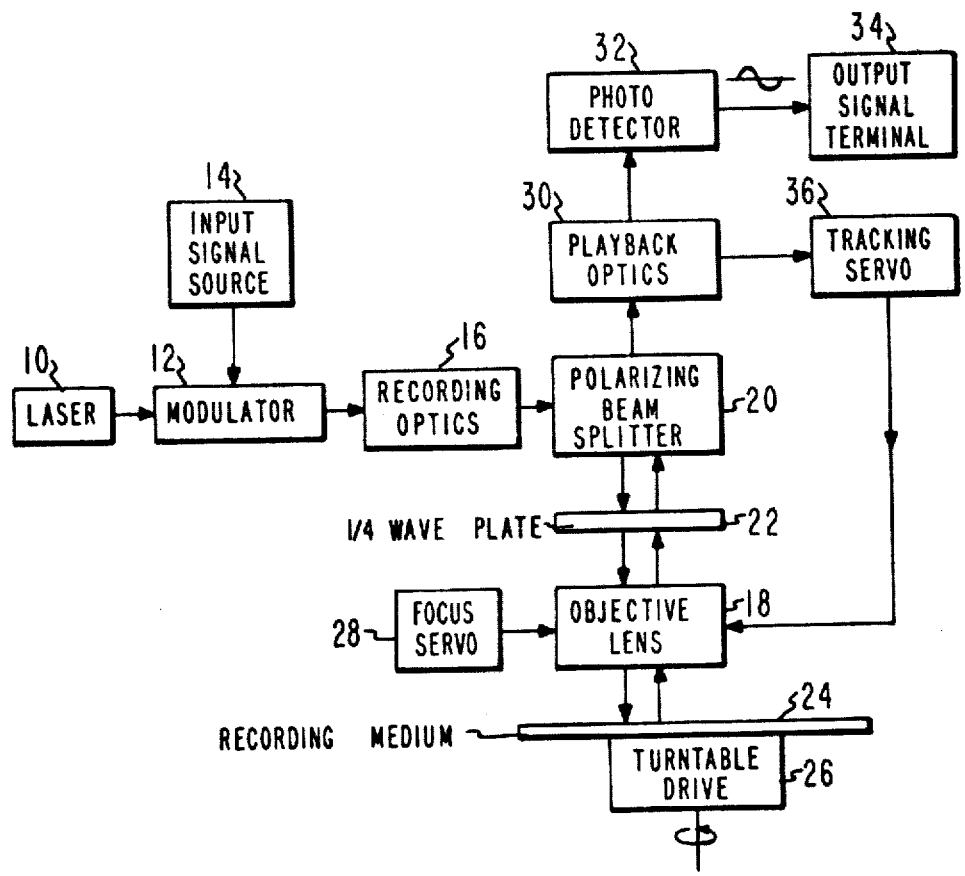
FIG. 3 is a schematic view of a system for recording and playback in which the present recording medium can be employed.

The use of the present recording medium can be explained in greater detail by referring to FIG. 3. For recording, the light emitted by a laser 10 is fed to a modulator 12 which modulates the light in response to an input electrical signal source 14. The modulated light is enlarged by recording optics 16 to increase the diameter of the intensity modulated laser beam so that it will fill the desired aperture of an objective lens 18. The enlarged modulated laser beam is totally reflected by a polarizing beam splitter 20 and passes through a beam-rotating ¼ wave plate 22 to the objective lens 18. The modulated recording beam then impinges upon a recording medium 24 as described in FIG. 1 and ablates a portion of the light absorbing layer to expose a portion of the reflecting layer. The recording medium 24 is rotated by the turntable drive 26 at about 1800 rpm in a spiral track. A focus servo 28 maintains a constant distance between the objective lens 18 and the surface of the recording medium 24.

For readout, an unmodulated and less intense laser beam, that is, one that will not cause ablation in the recording medium, follows the same path as the recording beam to the recording medium 24. The recorded reflection-anti-reflection pattern modulates the reflected light back through the objective lens 18 and the ¼ wave plate 22. The light, now rotated by 90° in polarization by the two passages through the ¼ wave plate 22, passes through the polarizing beam splitter 20 and is directed by playback optics 30 to a photodetector 32. The photodetector 32 converts the reflected light beam to an electrical output signal terminal 34 which corresponds to the input signal. A tracking servo 36 monitors the light through the playback optics 30 to ensure that the beam does not wander from the track during playback.

The present recording medium can produce high quality recordings with signal-to-noise ratios in the range of 45 to 50 decibels (dB), with average values of 48 dB. Light induced thermal recording on the organic dye layer through the overcoat layer is possible without reducing the signal-to-noise ratio more than about 5 dB. Surprisingly, when a titanium light absorbing layer is encapsulated with a silicon dioxide overcoat, the signal-to-noise ratios increase 3 to 4 dB. The above signal-to-noise ratio is within the range of broadcast standards. Recording media with lower signal-to-noise ratios are useful for consumer video disc or digitally encoded information records.

The invention will be further illustrated by the following examples, but the invention is not meant to be limited by the details described therein.

EXAMPLE 1

A glass disc 12 inches (30.5 centimeters) in diameter was coated with a layer of aluminum about 300 angstroms thick. The surface was oxidized to a depth of about 30 angstroms to passivate the metal layer. A layer of 4-phenylazo-1-naphthlyamine about 525 angstroms thick was deposited on the coated disc by evaporation and thermal decomposition of Sudan Black B dyestuff. An overcoat layer of silicon dioxide about 1670 angstroms thick was formed over the dye layer by glow discharge of silane.

The resultant recording medium was exposed to 50 nanosecond pulses of light having a wavelength of 4880 angstroms from an argon laser in an apparatus as in FIG. 3. The best recording was obtained at a power setting of 200-300 milliwatts from the laser and had a signal-to-noise ratio of 45 decibels.

There was no evidence upon playback that the silicon dioxide film had ruptured during recording. Microscopic examination at a magnification of 1000 times also showed that the film remained intact during recording. An aluminum coating was deposited on the silicon dioxide overcoat after recording. A diffraction pattern from the recording signals was visible in the aluminum coating, indicating that the surface of the silicon dioxide layer is somewhat perturbed.

EXAMPLE 2

A disc 12 inches (30.5 centimeters) in diameter was coated with a gold layer 800 angstroms thick. A 4-phenylazo-1-naphthylamine dye layer 400 angstrom thick was deposited on the gold layer, and an overcoat layer of silicon dioxide was formed on the dye layer as in Example 1. Recording was carried out on the resultant recording medium as in Example 1. The number of dropouts per recorded track was measured and found to average 14 per track.

Twelve milligrams of 5 micron diameter aluminum oxide dust particles were then applied to the recording medium during a 15 minute precipitation in a dust chamber. Following the dust application, the average number of dropouts increased to 150 per track. The recording medium was then spin cleaned with isopropyl alcohol. After cleaning the average number of dropouts was reduced to 29 per track.

EXAMPLE 3

A glass disc 12 inches (30.5 centimeters) in diameter was coated with a layer of aluminum about 300 angstroms thick. A layer of silicon dioxide about 800 angstroms thick was deposited on the aluminum layer, and a light absorbing layer of titanium about 50 angstroms thick was deposited on the silicon dioxide. The titanium layer was overcoated by electron beam evaporation of silicon dioxide to form a protective layer about 3340 angstroms thick. Recording on the resultant recording medium and on a similar recording medium without the silicon dioxide overcoat was carried out as in Example 1. At a power setting of 500 milliwatts, the uncoated recording medium had a signal-to-noise ratio of 46 dB as compared to a signal-to-noise ratio of 49 dB for the recording medium with the silicon dioxide overcoat layer. Over a range of power settings up to 1000 milliwatts, the highest signal-to-noise ratio obtained for the uncoated recording medium was 46 dB. The highest value obtained for the recording medium with the silicon dioxide overcoat was 50 dB.

EXAMPLE 4

A recording medium was prepared as in Example 2 except that a sucrose benzoate layer about 1630 angstroms thick was evaporated onto the dye layer in place of the silicon dioxide layer. The sucrose benzoate used had about 75 percent or more of the —OH groups on the sucrose replaced by

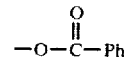

groups, where Ph is a phenyl moiety ($C_6H_5$—),

Before and after the application of the sucrose benzoate overcoat, recording was carried out as in Example 1. The objective lens used for recording had a cover glass correction for about 0.08 millimeters. At a laser power setting of 250 milliwatts, the recording medium before overcoating with sucrose benzoate had a signal-to-noise ratio of 43 dB. After overcoating the recording medium had a signal-to-noise ratio of 40 dB. The sucrose benzoate overcoat remained intact.

COMPARATIVE EXAMPLE

The following additional overcoat materials were deposited on the organic dye layer as in Example 4. None of these materials formed an amorphous, optical quality film.

TABLE

| | Trade Name | Description | Comments |
|---|---|---|---|
| 1 | Piccotex LC (Hercules, Inc.) | A low molecular weight copolymer of vinyl toluene and α-methylstyrene having a softening point of 90° C. | Hazy film |
| 2 | Piccotex 120 (Hercules, Inc.) | A low molecular weight copolymer of vinyl toluene and α-methylstyrene having a softening point of 120° C. | Hazy film |
| 3 | Kristalex | A transparent | Poly- |

TABLE-continued

| | Trade Name | Description | Comments |
|---|---|---|---|
| | 3085 (Hercules, Inc.) | low molecular weight thermoplastic derived from α-methylstyrene with a softening point of 85° C. | crystalline film |
| 4 | Kristalex 3100 (Hercules, Inc.) | A low molecular weight transparent resin derived from styrene derivatives and having a softening point of 100° C. | Polycrystalline film |
| 5 | Staybelite Ester 10 (Hercules, Inc.) | A glycerol ester of hydrogenated rosin with a softening point of 83° C. | Polycrystalline film |

We claim:

1. A record blank for use with a recording laser beam providing light of a given frequency, said blank comprising:
   a layer of light reflecting material;
   a layer of light absorbing material overlying said light reflecting material; and
   a solid, transparent, hard, inert, thin protective overcoat which is comprised of a material selected from the group consisting of derivatives of sucrose in which the hydroxyl groups of the sucrose are replaced by ester groups, pentaerythritol derivatives of rosin acids, and polymers formed from acetylene or perfluoromethylcyclohexane in a glow discharge, overlying said light absorbing layer such that surface contaminants can be removed from said overcoat; wherein the thickness of said overcoat is a function of the wavelength of said laser beam and of the refractive index of the overcoat material at said wavelength.

2. A blank according to claim 1 wherein a layer of dielectric material is situate between the light reflecting layer and the light absorbing layer.

3. A record blank according to claim 2 wherein said light reflecting layer is aluminum, said dielectric layer is silicon dioxide, and said light absorbing layer is titanium.

4. A record blank according to claim 1 wherein said light reflecting layer is passivated aluminum, and said light absorbing layer is 4-phenylazo-1-naphthylamine.

5. An information record for use in a playback apparatus using a playback light beam of a given frequency comprising:
   a layer of material which is reflective of light at said frequency;
   a layer of material which is absorptive of light at said frequency overlying said light reflecting layer, said absorbing layer having therein a succession of spaced pits representative of recorded information; and
   a solid, transparent, hard, inert, thin protective overcoat which is comprised of a material selected from the group consisting of derivatives of sucrose in which the hydroxyl groups of the sucrose are replaced by ester groups, pentaerythritol derivatives of rosin acids, and polymers formed from acetylene or perfluoromethylcyclohexane in a glow discharge, overlying said light absorbing layer such that surface contaminants can be removed from said overcoat;
   wherein the thickness of said overcoat is a function of the wavelength of the light beam and of the refractive index of the overcoat material at said wavelength.

6. An information record according to claim 5 wherein said light reflecting layer is passivated aluminum, and said light absorbing layer is 4-phenylazo-1-naphthylamine.

7. An information record according to claim 5 wherein a layer of dielectric material is situate between said light reflecting layer and said light absorbing layer.

8. An information record according to claim 7 wherein said light reflecting layer is aluminum, said dielectric layer is silicon dioxide, and said light absorbing layer is titanium.

* * * * *